United States Patent
Wang

(10) Patent No.: US 12,063,697 B2
(45) Date of Patent: Aug. 13, 2024

(54) DATA TRANSMISSION METHOD AND APPARATUS, AND TERMINAL

(71) Applicant: GUANGDONG OPPO MOBILE TELECOMMUNICATIONS CORP., LTD., Guangdong (CN)

(72) Inventor: Shukun Wang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 349 days.

(21) Appl. No.: 17/561,906

(22) Filed: Dec. 24, 2021

(65) Prior Publication Data

US 2022/0124839 A1 Apr. 21, 2022

Related U.S. Application Data

(63) Continuation of application No. PCT/CN2019/093394, filed on Jun. 27, 2019.

(51) Int. Cl.
*H04W 76/10* (2018.01)
*H04W 76/20* (2018.01)

(52) U.S. Cl.
CPC ........... *H04W 76/10* (2018.02); *H04W 76/20* (2018.02)

(58) Field of Classification Search
CPC ........... H04W 36/00837; H04W 48/20; H04W 36/08; H04W 48/02; H04W 76/18; H04W 36/00835; H04W 36/0085; H04W 88/02; H04W 48/18; H04W 84/12
See application file for complete search history.

(56) References Cited

U.S. PATENT DOCUMENTS

| | | | | |
|---|---|---|---|---|
| 9,179,402 | B2* | 11/2015 | Tsai | H04W 84/12 |
| 9,883,451 | B2* | 1/2018 | Gonsalves | H04W 8/24 |
| 10,397,833 | B2 | 8/2019 | Lee et al. | |
| 2015/0029949 | A1* | 1/2015 | Tsai | H04W 48/18 |
| | | | | 370/329 |
| 2017/0238221 | A1* | 8/2017 | Santhanam | H04W 36/00837 |
| | | | | 370/331 |

(Continued)

FOREIGN PATENT DOCUMENTS

| | | |
|---|---|---|
| CN | 106658758 A | 5/2017 |
| CN | 108307544 A | 7/2018 |

(Continued)

OTHER PUBLICATIONS

First Office Action of the Chinese application No. 201980091421.0, issued on Nov. 14, 2022 with machine translation by Global Dossier.

(Continued)

*Primary Examiner* — Jung Liu
(74) *Attorney, Agent, or Firm* — Ladas & Parry, LLP

(57) ABSTRACT

The embodiments of the present application provide a data transmission method and apparatus, and a terminal. The method comprises: a terminal sends uplink data to a network device by means of a NAS message; if the number of times the terminal fails to send the uplink data reaches a first threshold value, the terminal executes an RRC connection establishment process, establishes a dedicated bearer by means of the RRC connection establishment process, and sends the uplink data by means of the dedicated bearer.

17 Claims, 11 Drawing Sheets

(56) References Cited

U.S. PATENT DOCUMENTS

| | | |
|---|---|---|
| 2018/0234894 A1 | 8/2018 | Jiang |
| 2019/0037447 A1 | 1/2019 | Lee et al. |
| 2019/0104553 A1 | 4/2019 | Johansson et al. |
| 2019/0141515 A1 | 5/2019 | Kim |
| 2019/0223221 A1 | 7/2019 | Johansson et al. |
| 2019/0335363 A1 | 10/2019 | Lee et al. |
| 2019/0394808 A1 | 12/2019 | Lee et al. |
| 2020/0068442 A1 | 2/2020 | Lee et al. |
| 2023/0403346 A1* | 12/2023 | Dai ................ H04L 69/327 |

FOREIGN PATENT DOCUMENTS

| | | |
|---|---|---|
| CN | 108924882 A | 11/2018 |
| CN | 109429348 A | 3/2019 |
| WO | 2018174427 A1 | 9/2018 |
| WO | 2019022530 A1 | 1/2019 |
| WO | 2019062926 A1 | 4/2019 |
| WO | 2019159294 A1 | 8/2019 |
| WO | 2020258192 A1 | 12/2020 |
| WO | 2021141347 A1 | 7/2021 |

OTHER PUBLICATIONS

International Search Report in the international application No. PCT/CN2019/093394, mailed on Mar. 26, 2020.
Written Opinion of the International Searching Authority in the international application No. PCT/CN2019/093394, mailed on Mar. 26, 2020, with English translation provided by Google Translate.
Second Office Action and search report from the corresponding Chinese application No. 201980091421.0, issued on May 10, 2023.
3GPP TSG-RAN WG2 Meeting #100 R2-1713184, Reno, USA, Nov. 27-Dec. 1, 2017, Agenda Item: 9.14.2, Source: Huawei, HiSilicon, Neul, Title: Remaining issues for EDT in the CP solution for eMTC and NB-IoT, Document for: Discussion and decision.
Supplementary European Search Report in the European application No. 19935453.1, mailed on May 2, 2022.
Written Opinion of the International Search Authority in the International application No. PCT/CN2019/093394, mailed on Mar. 26, 2020.
International Preliminary Report on Patentability (Chapter I) in the international application No. PCT/CN2019/093394, issued on Dec. 28, 2021.

* cited by examiner

DATA TRANSMISSION METHOD AND APPARATUS, AND TERMINAL

CROSS REFERENCE TO RELATED APPLICATION

This is a continuation of International Application No. PCT/CN2019/093394, filed on Jun. 27, 2019, and entitled "DATA TRANSMISSION METHOD AND APPARATUS, AND TERMINAL", the disclosure of which is hereby incorporated by reference in its entirety.

TECHNICAL FIELD

Embodiments of the present disclosure relate to the technical field of mobile communication, and in particular to a method, apparatus and terminal for data transmission.

BACKGROUND

In Long Term Evolution, Early Data Transmission (EDT) is introduced. EDT data transmission is also referred to as small data transmission or small data packet transmission or small packet data transmission. Since the Msg3 resource and a Common Control Channel (CCCH) channel is used for the EDT data transmission, the uplink coverage is limited, which may cause failure of the EDT data transmission.

BRIEF DESCRIPTION OF THE DRAWINGS

The accompanying drawings described herein are intended to provide a further understanding of the present disclosure and form a part of the present disclosure. The illustrative embodiments of the present disclosure and the description thereof are intended to explain the present disclosure, and do not constitute an improper limitation of the present disclosure.

DETAILED DESCRIPTION

The technical solutions in the embodiments of the disclosure will be described below with reference to the accompanying drawings in the embodiments of this disclosure. It will be apparent that the described embodiments are some but not all of the embodiments of the disclosure. Based on the embodiments of the present disclosure, all other embodiments obtained by those skilled in the art without creative effort fall within the scope of the present disclosure.

The technical solutions of the embodiments of the present disclosure may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunications System (UMTS) system, a Worldwide Interoperability for Microwave Access (WiMAX) communication system, or a 5G system.

Figure 1:
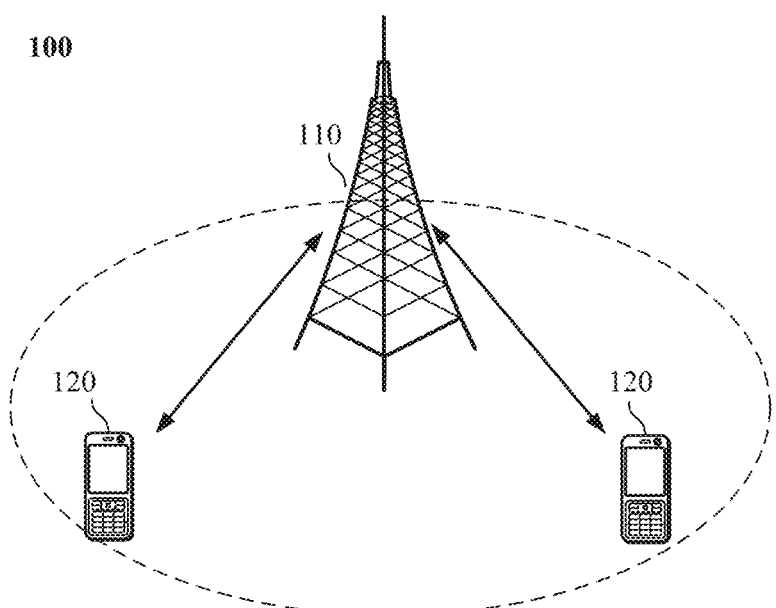
FIG. 1 is a schematic diagram of a communication system architecture according to an embodiment of the present disclosure.

Exemplarily, a communication system 100 to which the present embodiment is applied is shown in FIG. 1. The communication system 100 may include a network device 110, which may be a device that communicates with a terminal 120 (or referred to as a communication terminal, or a terminal). The network device 110 may provide communication coverage for a particular geographic area and may communicate with terminals located within the coverage area. Alternatively, the network device 110 may be a Base Transceiver Station (BTS) in a GSM system or a CDMA system. The network device 110 may also be a NodeB (NB) in a WCDMA system. The network device 110 may further be an Evolutional Node B (eNB or eNodeB) in an LTE system, or may be a radio controller in a Cloud Radio Access Network (CRAN). Or, the network device 110 may be a mobile switching center, a relay station, an access point, a vehicle-mounted device, a wearable device, a hub, a switch, a bridge, a router, a network-side device in a 5G network, a network device in a future evolved Public Land Mobile Network (PLMN), or the like.

The communication system 100 may also include at least one terminal 120 located within the coverage of the network device 110. The term "terminal" used herein includes, but is not limited to, connection via wired lines, such as via a Public Switched Telephone Networks (PSTN), a Digital Subscriber Line (DSL), a digital cable, a direct cable connection; and/or another data connection/network; and/or via a wireless interface, e.g., for a cellular network, a Wireless Local Area Network (WLAN), a digital television network such as a DVB-H network, a satellite network, an AM-FM broadcast transmitter; and/or means of another terminal arranged to receive/transmit a communication signal; and/or an Internet of Things (IoT) device. A terminal set to communicate through a wireless interface may be referred to as "a wireless communication terminal", "a wireless terminal" or "a mobile terminal". Examples of the mobile terminal includes, but is not limited to, a satellite or cellular phone; a Personal Communications System (PCS) terminal that may combine cellular radio telephone and data processing, facsimile, and data communication capabilities; a Personal Digital Assistant (PDA) that may include a radio telephone, a pager, an Internet/Intranet access, a web browser, a notebook, a calendar, and/or a Global Positioning System (GPS) receiver; and a conventional laptop and/or palmtop receiver or other electronic devices including a radio telephone transceiver. A terminal may refer to an access terminal, a user equipment (UE), a subscriber unit, a subscriber station, a mobile station, a mobile station, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a PDA, a handheld device with a wireless communication function, a computing device or other processing device connected to a wireless modem, an in-vehicle device, a wearable device, a terminal in a 5G network, a terminal in a future evolved PLMN, or the like.

Alternatively, Device to Device (D2D) communication may be performed between multiple terminals 120.

Alternatively, a 5G system or 5G network may also be referred to as a new New Radio (NR) system or NR network.

FIG. 1 illustrates one network device and two terminals. Alternatively, the communication system 100 may include a plurality of network devices, and other numbers of terminals may be included within a coverage area of each of the network devices, which is not limited in the embodiments of the present disclosure.

Alternatively, the communication system 100 may further include a network controller, a mobility management entity (MME), and other network entities, which are not limited in the embodiments of the present disclosure.

It should be understood that a device with a communication function in a network/system in the embodiments of the present disclosure may be referred to as a communication device. Taking the communication system 100 shown in FIG. 1 as an example, the communication device may include a network device 110 and a terminal 120 with a communication function. The network device 110 and the terminal 120 may be specific devices described above, and details are not described herein. The communication device may further include other devices in the communication system 100, such as a network controller, a mobility management entity, and other network entities, which are not limited in the embodiments of the present disclosure.

It should be understood that the terms "system" and "network" are used herein only for describing an association relationship of the associated objects, indicating that there may be three relationships, for example, A and/or B, which may indicate a presence of A alone, a presence of both A and B, and a presence of B alone. In addition, the character "/" herein generally indicates that the former associated object and the latter object is with a "or" relationship.

To facilitate understanding of the technical solutions of the embodiments of the present disclosure, the following describes the technical solutions related to the embodiments of the present disclosure.

EDT Data Transmission

The EDT data transmission is introduced in UTE, during the EDT data transmission, the UE may always remain in an idle state, a suspend state or an inactive state to complete uplink EDT data transmission and/or downlink EDT data transmission.

Figure 2A:
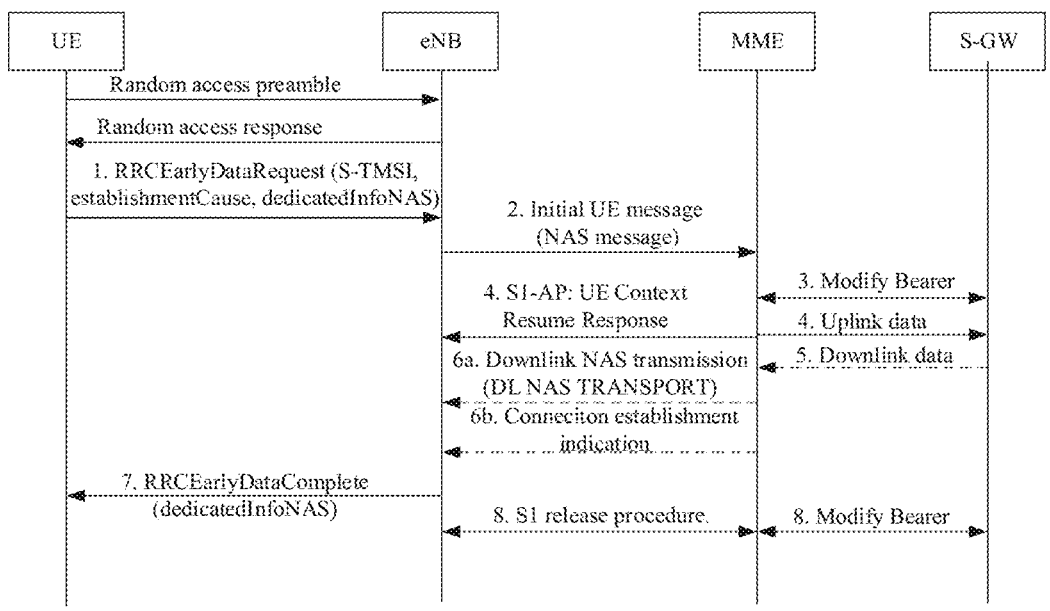
FIG. 2A is a flowchart of EDT data transmission on a control e according to an embodiment of the present disclosure.

The EDT data transmission may adopt a transmission scheme on a control plane, as shown in FIG. 2A, including the following actions 1-8.

In action 1, a UE transmits a Radio Resource Control (RRC) EarlyDataRequest message to an eNB.

Here, the RRCEarlyDataRequest message may also be referred to as an EDT data transmission request message, a small data transmission request message, a small data packet transmission request message, or a small packet data transmission request message.

Here, the RRCEarlyDataRequest message may carry the following information: S-TMSI, establishmentCause, or dedicatedInfoNAS. The dedicatedInfoNAS may be EDT data (or referred to as small data, or small data packet, or small packet data).

In action 2, the eNB transmits an Initial UE message to a mobility management entity, and the initial UE message may carry a Non-Access Stratum (NAS) message (NAS message).

In action 3, a bearer between the MME and an S-GW (Serving GateWay), (Modify Bearer) is modified.

In action 4, the MME transmits the uplink data to the S-GW (Uplink data).

In action the S-GW transmits downlink data to the MME (Downlink data).

In action 6a, downlink NAS transmission is performed NAS TRANSPORT).

In action 6b, CONNECTION is established.

In action 7, the eNB transmits an RRCEarlyDataComplete message to the UE.

Here, the RRCEarlyDataComplete message may carry dedicatedInfoNAS, which is the EDT data (or referred to as the small data, or the small data packet, or the small packet data).

In action 8, the bearer between the MME and the S-GW is modified (Modify Bearer), and the S1 a release procedure is executed between the eNB and the MME (S1 release procedure).

Figure 3:
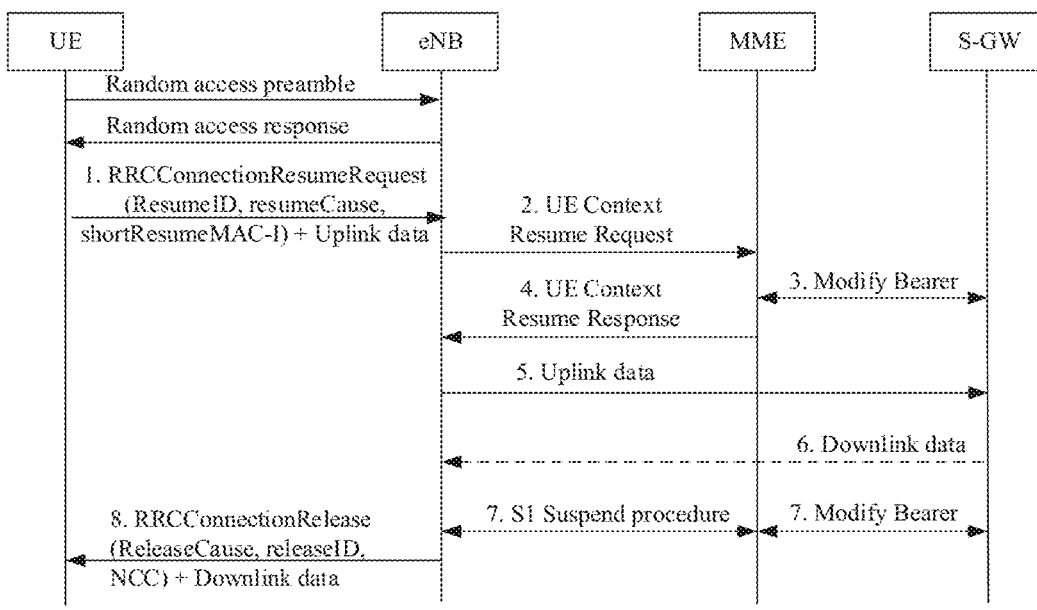
FIG. 3 is a flowchart of EDT data transmission on a user plane according to an embodiment of the present disclosure.

The EDT data transmission may also adopt a transmission scheme on a user plane, as shown in FIG. 3, including the following actions 1-8.

In action 1, the UE transmits an RRCConnectionResumeRequest message and Uplink data to the eNB.

Here, the RRCConnectionResumeRequest may carry the following information: ResumeID, resumeCause or shortResumeMAC-I.

In action 2, the eNB transmits a UE Context Resume Request message to the MME.

In action 3, a bearer between the MME and the S-GW is modified (Modify Bearer).

In action 4, the MME transmits a UE Context Resume Response message to the eNB.

In action 5, the eNB transmits uplink data to the S-GW.

In action 6, the S-GW transmits downlink data to the eNB.

In action 7, the bearer between the MME and the S-GW is modified (Modify Bearer), and the S1 suspension procedure is executed between the eNB and the MME.

In action 8, the eNB transmits an RRCConnectionRelease message and Downlink data to the UE.

Here, the RRCConnectionRelease message may carry the following information: ReleaseCause, releaseID and NCC.

It should be noted that FIGS. 2A and 3 are illustrated by taking the LTE as an example. The NR are similar to the UTE, and the difference is that for the NR, the eNB is replaced with gNB, the Mobility Management Entity (MME) is replaced with an Access and Mobility Management Function (AMF), and the Serving Gateway (S-GW) is replaced with a User Plane Function (UPF).

For the UE side, the UE Non-Access Stratum (NAS) (i.e., the NAS layer of the terminal) may transmit a NAS message to the UE Access Stratum (AS) (i.e., the AS layer of the terminal). After receiving the NAS message from the UE NAS (i.e., the UE AS is trigger by the UE NAS), the UE AS may start an EDT initialization procedure (including starting a timer T300). The LIE may carry the NAS message (which may carry the uplink data) in the Msg3 of the random access procedure. If the timer expires after the UE AS transmits the Msg3, the UE AS may notify the UE NAS of the transmission failure of the RRC connection, the transmission failure of the NAS message, or the transmission failure of the uplink data. If the UE NAS needs to trigger the UE AS to retransmit the NAS message, the procedure will be repeated as described above, Since the transmission of the NAS message (or the uplink data) occupies the Msg3 resources and uses the CCCH channel, the uplink coverage is limited. Therefore, if the uplink data is carried by the Msg3, the uplink data transmission may fail in the case of the limited uplink coverage. For this reason, the following technical solutions of the embodiments of the present disclosure are proposed.

Figure 4:
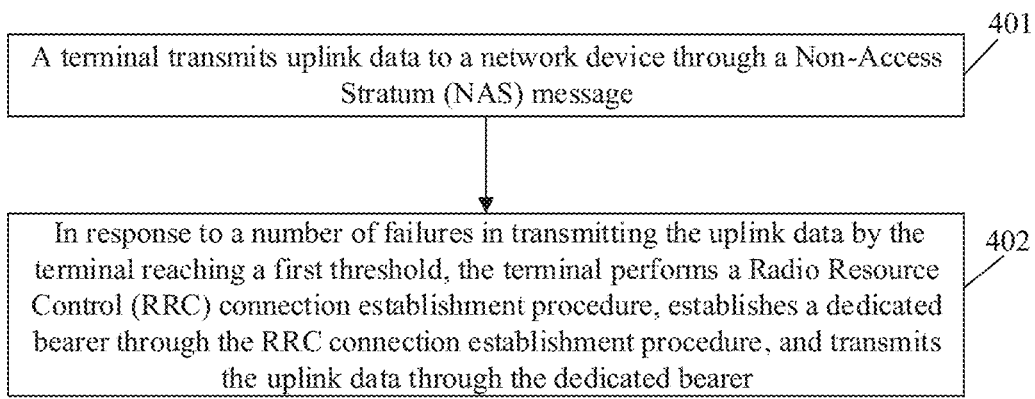
FIG. 4 is a flowchart of a method for data transmission according to an embodiment of the present disclosure.

FIG. 4 is a flowchart of a method for data transmission according to an embodiment of the present disclosure. As shown in FIG. 4, the method for data transmission includes the following steps of S401 and S402.

In action S401, a terminal transmits uplink data to a network device through a Non-Access Stratum (NAS) message.

In the embodiment of the present disclosure, the terminal may be any device capable of communicating with a network, such as a mobile phone, a tablet computer, a notebook, an in-vehicle terminal, or a wearable device.

In the embodiment of the present disclosure, the network device may be a base station, such as a 5G base station (i.e., gNB) and a 4G base station (i.e., eNB).

Figure 2B:
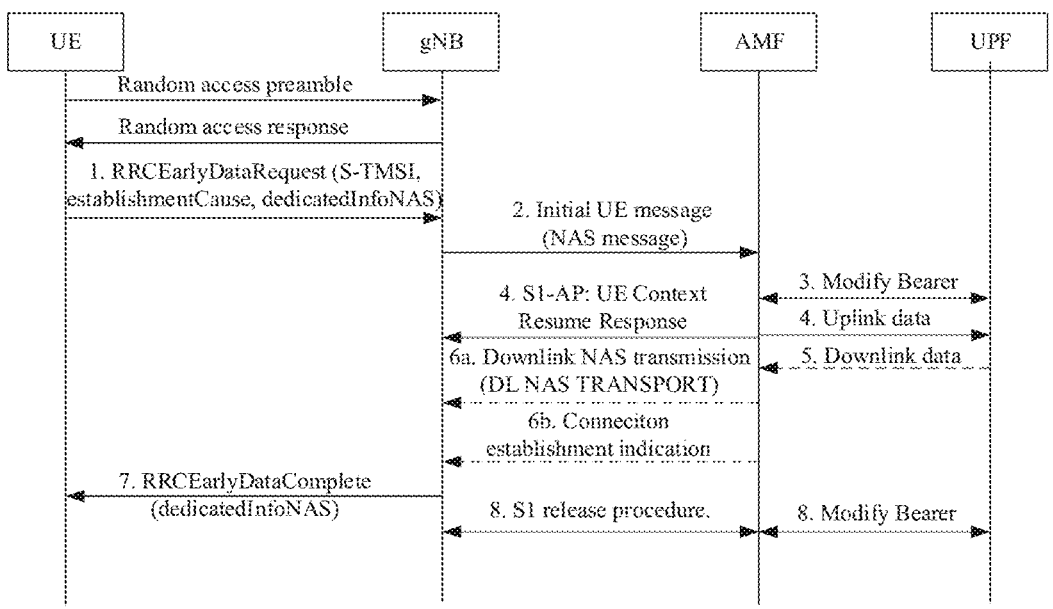
FIG. 2B is a flowchart of another EDT data transmission on a control plane according to an embodiment of the present disclosure.

In the embodiment of the present disclosure, uplink data transmission to the network device through the NAS message belongs to the transmission scheme on the control plane to transmit the uplink data. In one example, the transmission scheme on the control plane shown in FIG. 2B may be configured to transmit the uplink data. The flow of FIG. 2B is consistent with the flow of FIG. 2A. The difference between FIG. 2B and FIG. 2A is that FIG. 2A is described by using the LTE as an example, and FIG. 2B is described by using the NR as an example.

In some alternative embodiments of the present disclosure, the uplink data may refer to uplink EDT data, or small data, or a small data packet, or small packet data. The uplink data may be carried in the NAS message for transmission. Further, the NAS message may be transmitted through the Msg3. Taking FIG. 2B as an example, the Msg3 message may refer to the RRCEarlyDataRequest message. The RRCEarlyDataRequest message may also be referred to as a small data transmission request message, a small data packet transmission request message, a small packet data transmission request message, or an EDT data transmission request message.

In action S402, in response to a number of failures in transmitting the uplink data by the terminal reaching a first threshold, the terminal performs a Radio Resource Control (RRC) connection establishment procedure, establishes a dedicated bearer through the RRC connection establishment procedure, and transmits the uplink data through the dedicated bearer.

In the embodiment of the present disclosure, the NAS layer of the terminal may trigger an Access Stratum (AS) layer of the terminal to transmit the uplink data to the network device and the AS layer of the terminal may start a first timer. If transmission of the uplink data is not completed upon expiration of the first timer, the AS layer of the terminal may notify the NAS layer of the terminal that transmission of the uplink data fails. If the number of failures in transmitting the uplink data by the terminal reaches a first threshold, the terminal may perform the RRC connection establishment procedure, establish the dedicated bearer through the RRC connection establishment procedure, and transmit the uplink data through the dedicated bearer.

For example, the UE NAS may transmit a NAS PDU to the UE AS and may trigger the UE AS to transmit a RRCEarlyDataRequest message to the base station (such as the gNB shown in FIG. 2B). The UE AS, when initializing an EDT procedure, may start a first timer (such as T300). In response to the expiration of the first timer, the UE AS may notify the UE NAS that transmission of the uplink data fails or the RRC transmission fails.

Here, the NAS layer of the terminal may determine that the number of failures in transmitting the uplink data by the terminal reaches the first threshold, or, the AS layer of the terminal may determine that the number of failures in transmitting the uplink data by the terminal reaches the first threshold value, which will be described in detail below.

The NAS layer of the terminal may determine that the number of failures in transmitting the uplink data reaches the first threshold, and the NAS layer of the terminal may notify the AS layer of the terminal to transmit an RRC connection establishment request message.

Specifically, each time after the NAS layer of the terminal triggers the AS layer of the terminal to transmit the uplink data to the network device, 1 may be added to a value of the first counter. The NAS layer of the terminal may determine that the value of the first counter reaches the first threshold.

For example, when the UE NAS maintains a counter (i.e., a first counter) and each time after the AS layer of the terminal is triggered to transmit the NAS message carrying the uplink data, 1 may be added to a value of the counter. When the value of the counter is greater than a certain threshold (i.e., the first threshold), the UE NAS may notify the UE AS to transmit the RRC connection establishment request message, fall back to the RRC connection establishment procedure, and transmit the uplink data through the dedicated bearer (or the dedicated channel).

It should be noted that the first counter may be configured to count transmission times of same uplink data. For example, the first counter may be configured to count retransmission times of the same NAS message. If the NAS message changes, e.g. the message becomes longer, the first counter may be reset.

2) The AS layer of the terminal may determine that the number of failures in transmitting the uplink data reaches the first threshold, the AS layer of the terminal may transmit a RRC connection establishment request message, and notify the NAS layer of the terminal to perform the RRC connection establishment procedure.

Specifically, each time after the AS layer of the terminal transmits the uplink data to the network device, 1 may be added to a value of a second counter. The AS layer of the terminal may determine that the value of the second counter reaches the first threshold.

For example, when the UE AS maintains a counter (i.e., a second counter) and the UE AS transmits the NAS message carrying the uplink data, 1 may be added to a value of the counter. When the value of the counter is greater than a certain threshold (i.e., the first threshold), the UE AS may notify the UE NAS that the UE AS falls back to the RRC connection establishment procedure and transmits the uplink data through the dedicated bearer (or the dedicated channel).

It should be noted that the second counter may be configured to count transmission times of same uplink data. For example, the second counter may be configured to count retransmission times of the same NAS message. If the NAS message changes, e.g. the message becomes longer, the second counter may be reset.

In the embodiment of the present disclosure, the first threshold may be customized by the terminal, or configured by the network device through a system broadcast message, or customized by the system.

Figure 5:
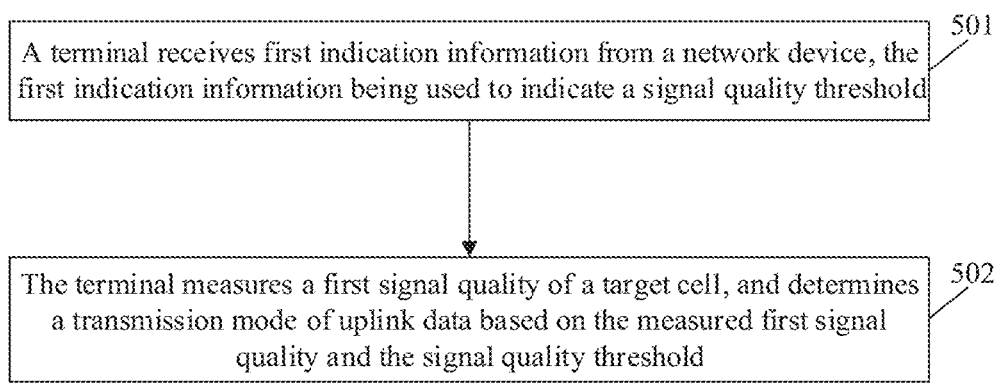
FIG. 5 is a flowchart of another method for data transmission according to an embodiment of the present disclosure.

FIG. 5 is a flowchart of a method for data transmission according to an embodiment of the present disclosure. As shown in FIG. 5, the method for data transmission includes the following actions S501 and S502.

In action 501, a terminal receives first indication information from a network device, the first indication information being used to indicate a signal quality threshold.

In the embodiment of the present disclosure, the terminal may be any device capable of communicating with a network, such as a mobile phone, a tablet computer, a notebook, an in-vehicle terminal, or a wearable device.

In this embodiment of the present disclosure, the network device may be a base station, such as a 5G base station (i.e., gNB) and a 4G base station (i.e., eNB).

In an alternative embodiment of the present disclosure, the first indication information may be carried in a system broadcast message. Specifically, the network device may transmit the system broadcast message, the system broadcast message may carry the first indication information, and the first indication information may be configured to indicate the signal quality threshold.

In the present embodiment, the signal quality may include at least one of Reference Signal Received Power (RSRP), Reference Signal Received Quality (RSRQ), or Signal to Interference plus Noise Ratio (SINR). Accordingly, the first indication information may be configured to indicate at least one of an RSRP threshold, an RSRQ threshold, or an SINR threshold.

In action 502, the terminal measures a first signal quality of a target cell, and determines a transmission mode of uplink data based on the measured first signal quality and the signal quality threshold.

In an embodiment of the present disclosure, the measured first signal quality by the terminal may include at least one of a measured RSRP, a measured RSRQ, or a measured SINR.

In the embodiment of the present disclosure, in response to the measured first signal quality being greater than or equal to the signal quality threshold, the terminal may determine to transmit the uplink data to the network device in an Early Data Transmission (EDT) mode. In response to the measured first signal quality being less than the signal quality threshold, the terminal may determine to transmit the uplink data to the network device through a dedicated bearer.

Here, the EDT mode may refer to the transmission scheme shown in FIGS. 2A and 2B. The dedicated bearer may mean that the terminal enters a connected state and transmits the uplink data through the dedicated bearer (or the dedicated channel). In the embodiment of the present disclosure, the uplink data may refer to the uplink EDT data, the small data, the small data packet, or the small packet data.

In this embodiment of the present disclosure, in response to the measured first signal quality being less than the signal quality threshold, an Access Stratum (AS) layer of the terminal may notify a Non-Access Stratum (NAS) layer of the terminal that transmission of the uplink data is not supported. In response to the measured first signal quality being greater than or equal to the signal quality threshold, the AS layer of the terminal may notify the NAS layer of the terminal that the transmission of the uplink data is supported. In this way, the NAS layer of the terminal may determine whether to continue triggering the AS layer of the terminal to transmit the NAS message according to whether the transmission of the uplink data is supported.

The technical solutions of the embodiments of the present disclosure can be applicable to both LTE EDT scenes and NR EDT scenes. On the other hand, it may be applicable to EDT data transmission in a 4-step random access procedure, and may also be applicable to EDT data transmission in a 2-step random access procedure.

Figure 6:
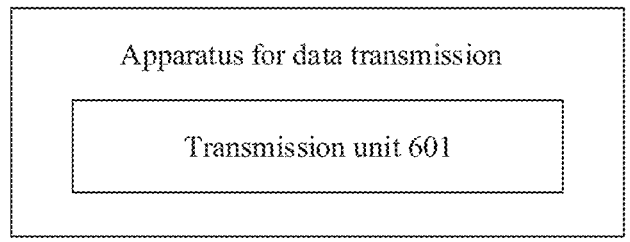
FIG. 6 is a schematic structural diagram of an apparatus for data transmission according to an embodiment of the present disclosure.

FIG. 6 is a schematic structural diagram of an apparatus for data transmission according to an embodiment of the present disclosure, which is applied to a terminal side. As shown in FIG. 6, the apparatus for data transmission includes a transmission unit 601.

The transmission unit 601 is configured to transmit uplink data to a network device through a Non-Access Stratum (NAS) message; and in response to a number of failures in transmitting the uplink data by the terminal reaching a first threshold, perform a Radio Resource Control (RRC) connection establishment procedure, establish a dedicated bearer through the RRC connection establishment procedure, and transmit the uplink data through the dedicated bearer.

In an embodiment, the transmitting unit 601 may include a NAS layer (not shown) and an AS layer (not shown).

The NAS layer may be configured to trigger the AS layer to transmit the uplink data to the network device, and start a first timer.

In response to failing to complete transmission of the uplink data upon expiration of the first timer, the AS layer may be further configured to notify the NAS layer that transmission of the uplink data fails.

In an embodiment, the NAS layer may be configured to determine that the number of failures in transmitting the uplink data reaches the first threshold, and notify the AS layer to transmit a RRC connection establishment request message.

In an embodiment, each time after the NAS layer triggers the AS layer to transmit the uplink data to the network device, the NAS layer may be configured to add 1 to a value of a first counter; and the NAS layer may further be configured to determine that the value of the first counter reaches the first threshold.

In an embodiment, the first counter may be configured to count transmission times of same uplink data.

In an embodiment, the AS layer may be configured to determine that the number of failures in transmitting the uplink data reaches the first threshold. And the AS layer may further be configured to transmit a RRC connection establishment request message, and notify the NAS layer of the terminal to perform the RRC connection establishment procedure.

In an embodiment, each time after the AS layer transmits the uplink data to the network device, the AS layer may be configured to add 1 to a value of a second counter. The AS layer may further be configured to determine that the value of the second counter reaches the first threshold.

In an embodiment, the second counter may be configured to count transmission times of same uplink data.

It should be understood by those skilled in the art that the description of the aforementioned apparatus for data transmission of the embodiments of the present disclosure may be understood with reference to the description of the method for data transmission of the embodiments of the present disclosure.

Figure 7:
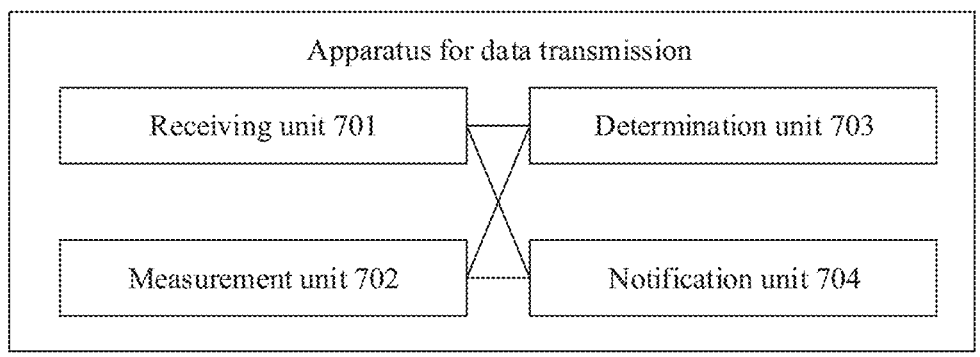
FIG. 7 is a schematic structural diagram of another apparatus for data transmission according to an embodiment of the present disclosure.

FIG. 7 is a schematic structural diagram of another apparatus for data transmission according to an embodiment of the present disclosure, which is applied to a terminal side. As shown in FIG. 7, the apparatus for data transmission includes a receiving unit 701, a measurement unit 702 and a determination unit 703.

The receiving unit 701 is configured to receive first indication information from a network device, the first indication information being used to indicate a signal quality threshold.

The measurement unit 702 is configured to measure a first signal quality of a target cell.

The determination unit 703 is configured to determine a transmission mode of uplink data based on the measured first signal quality and the signal quality threshold.

In an embodiment, in response to the measured first signal quality being greater than or equal to the signal quality threshold, the determination unit 703 may be configured to determine to transmit the uplink data to the network device in an Early Data Transmission (EDT) mode. In response to the measured first signal quality being less than the signal quality threshold, the determination unit 703 may be configured to determine to transmit the uplink data to the network device through a dedicated bearer.

In an embodiment, the apparatus may further include a notification unit 704.

In response to the measured first signal quality being less than the signal quality threshold, the notification unit 704 may be configured to notify, by an Access Stratum (AS) layer of the terminal, a Non-Access Stratum (NAS) layer of the terminal that transmission of the uplink data is not supported. In response to the measured first signal quality being greater than or equal to the signal quality threshold, the notification unit 704 may be configured to notify, by the AS layer of the terminal, the NAS layer of the terminal that the transmission of the uplink data is supported.

In one embodiment, the signal quality may include at least one of Reference Signal Received Power (RSRP), Reference Signal Received Quality (RSRQ) or Signal to Interference plus Noise Ratio (SINR).

It should be understood by those skilled in the art that the description of the aforementioned apparatus for data transmission of the embodiments of the present disclosure may be understood with reference to the description of the method for data transmission of the embodiments of the present disclosure.

Figure 8:
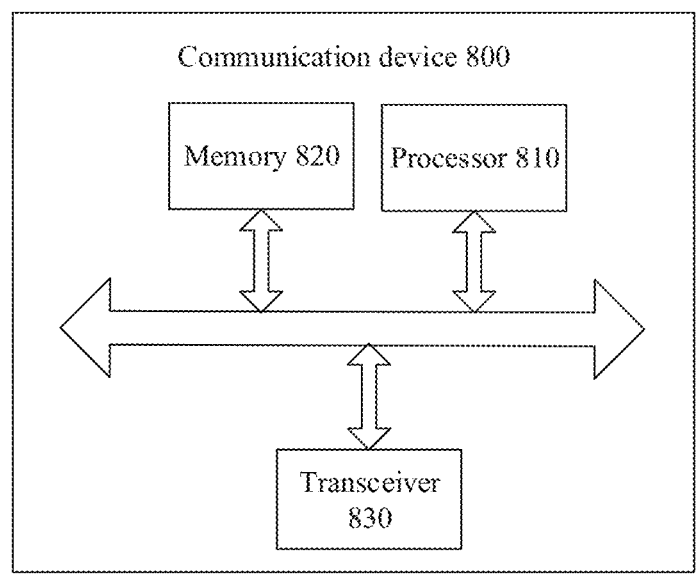
FIG. 8 is a schematic structural diagram of a communication device according to an embodiment of the present disclosure.

FIG. 8 is a schematic structural diagram of a communication device 800 according to an embodiment of the present disclosure. The communication device may be a terminal or a network device. The communication device 800 shown in FIG. 800 includes a processor 810 that is configured to call and run a computer program stored in a memory to perform the method in the embodiments of the present disclosure.

Alternatively, as shown in FIG. 8, the communication device 800 may further include a memory 820. The processor 810 may configured to call and run a computer program stored in the memory 820 to perform the method in the embodiments of the present disclosure.

The memory 820 may be a separate device independent of the processor 810, or may be integrated into the processor 810.

Alternatively, as shown in FIG. 8, the communication device 800 may further include a transceiver 830 that may be controlled by the processor 810 to communicate with other devices. Specifically, the transceiver 830 can transmit information or data to other devices, or receive information or data from other devices.

The transceiver 830 may include a transmitter and a receiver. The transceiver 830 may further include antennas, where the number of antennas may be one or more.

Alternatively, the communication device 800 may be specifically the network device of the embodiment of the disclosure, and the communication device 800 may implement the corresponding processes implemented by the network device in each method of the embodiments of the disclosure. For brevity, details are not described herein.

Alternatively, the communication device 800 may be specifically a mobile terminal/a terminal according to an embodiment of the disclosure, and the communication device 800 may implement the corresponding processes implemented by the mobile terminal/terminal in each method of the embodiments of the disclosure. For brevity, details are not described herein.

Figure 9:
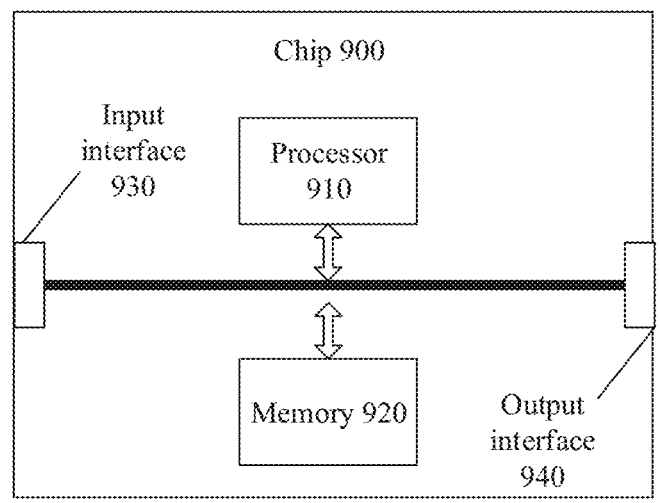
FIG. 9 is a schematic structural diagram of a chip according to an embodiment of the present disclosure.

FIG. 9 is a schematic structural diagram of a chip according to an embodiment of the present disclosure. The chip 900 shown in FIG. 9 includes a processor 910 that may call and run a computer program from a memory to perform the method of the embodiments of the present disclosure.

Alternatively, as shown in FIG. 9, the chip 900 may further include a memory 920. The processor 910 may configured to call and run a computer program stored in the memory 920 to perform the method in the embodiments of the present disclosure.

The memory 920 may be a separate device independent of the processor 910, or may be integrated into the processor 910.

Alternatively, the chip 900 may further include an input interface 930. The processor 910 may control the input interface 930 to communicate with other devices or chips, Specifically, the input interface 930 may acquire information or data transmitted by the other devices or chips.

Alternatively, the chip 900 may further include an output interface 940. The processor 910 may control the output interface 940 to communicate with other devices or chips. Specifically, the output interface 940 may output information or data to the other devices or chips.

Alternatively, the chip may be applied to the network device in the embodiment of the present disclosure, and the chip may implement the corresponding processes implemented by the mobile terminal/terminal in each method of the embodiments of the disclosure. For brevity, details are not described herein.

Alternatively, the chip may be applied to the mobile terminal/terminal in the embodiments of the present disclosure, and the chip may implement the corresponding processes implemented by the mobile terminal/terminal in each method of the embodiments of the disclosure. For brevity, details are not described herein.

It should be understood that the chip mentioned in the embodiments of the present disclosure may also be referred to as a system-level-chip, a system chip, a chip system, or a system-on-a-chip.

Figure 10:
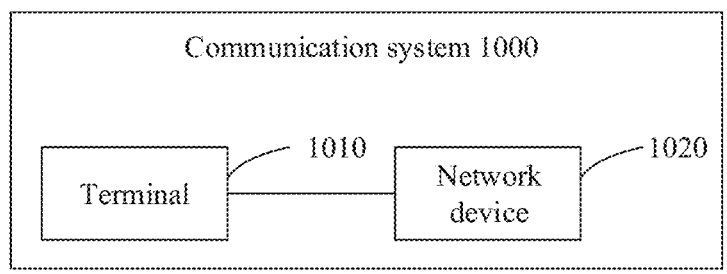
FIG. 10 is a schematic block diagram of a communication system according to an embodiment of the present disclosure.

FIG. 10 is a schematic block diagram of a communication system 1000 according to an embodiment of the present disclosure. As shown, the communication system 1000 may include a terminal 1010 and a network device 1020.

The terminal 1010 may be configured to implement corresponding functions implemented by the terminal in the aforementioned method and the network device 1020 may be configured to implement corresponding functions implemented by the network device in the aforementioned method. For brevity, details are not described herein.

Embodiments of the present disclosure provide a method and apparatus and terminal for data transmission.

A method for data transmission provided in the embodiment of the present disclosure includes the following operations.

A terminal transmits t uplink data to a network device through a Non-Access Stratum (NAS) message.

In response to a number of failures in transmitting the uplink data by the terminal reaching a first threshold, the terminal performs a Radio Resource Control (RRC) connection establishment procedure, establishes a dedicated bearer through the RRC connection establishment procedure, and transmits the uplink data through the dedicated bearer.

A method for data transmission provided in the embodiment of the present disclosure includes the following operations.

A terminal receives first indication information from a network device, the first indication information being used to indicate a signal quality threshold.

The terminal measures a first signal quality of a target cell, and determines a transmission mode of uplink data based on the measured first signal quality and the signal quality threshold.

An apparatus for data transmission provided in the embodiment of the present disclosure includes a transmission unit.

The transmission unit is configured to transmit uplink data to a network device through a Non-Access Stratum (NAS) message: and in response to a number of failures in transmitting the uplink data by the terminal reaches a first threshold, the transmission unit is further configured to perform a Radio Resource Control (RRC) connection establishment procedure, establish a dedicated hearer through the RRC connection establishment procedure, and transmit the uplink data through the dedicated bearer.

An apparatus for data transmission provided in the embodiment of the present disclosure includes a receiving unit, a measurement unit and a determination unit.

The receiving unit is configured to receive first indication information from a network device, the first indication information being used to indicate a signal quality threshold.

The measurement unit is configured to measure a first signal quality of a target cell.

The determination unit is configured to determine a transmission mode of uplink data based on the measured first signal quality and the signal quality threshold.

A terminal provided by the embodiment of the present disclosure includes a processor and a memory. The memory is used for storing a computer program, and the processor configured to call and run the computer program stored in the memory to perform the aforementioned method for data transmission.

A chip provided in the embodiment of the present disclosure is configured to perform the aforementioned method for data transmission.

Specifically, the chip includes a processor to call and run a computer program from a memory, so that a device installed with the chip performs the method performs the aforementioned method for data transmission.

A computer-readable storage medium provided by an embodiment of the present disclosure is configured for storing a computer program causing a computer to perform the aforementioned method for data transmission.

A computer program product provided by the present disclosure includes computer program instructions that cause a computer to perform the aforementioned method for data transmission.

The computer program provided by the embodiment of the present disclosure, when run on a computer, causes the computer to perform the aforementioned method for data transmission.

According to the above technical solutions, the terminal transmits the uplink data in the EDT mode (i.e., the uplink data is transmitted through the NAS message). In response to a number of failures in transmitting the uplink data by the terminal reaches a first threshold, the terminal performs a Radio Resource Control (RRC) connection establishment procedure, the terminal establishes a dedicated bearer through the RRC connection establishment procedure, and the terminal transmits the uplink data through the dedicated bearer. Therefore, the data transmission mode is changed so that the data transmission can be fast and efficient.

It should be understood that the processor of the embodiment of the present disclosure may be an integrated circuit chip with a capability for processing signals. In the implementation, the steps of the above method embodiments may be accomplished by integrated logic circuitry of hardware in the processor or instructions in the form of software. The aforementioned processor may be a general purpose processor, a digital signal processor (DSP), an application specific integrated circuit (ASIC), a field programmable gate array (FPGA) or other programmable logic devices, a discrete gate or a transistor logic device, or a discrete hardware component. The methods, steps, and logical block diagrams disclosed in the embodiments of the present disclosure may be implemented or performed. The general purpose processor may be a microprocessor, or the processor may be any conventional processor or the like. The steps of the method disclosed in connection with the embodiments of the present disclosure may be directly performed by a hardware decoding processor or performed by a combination of hardware and software modules in the decoding processor. The software module may be located in a mature storage medium in the art, such as a random access memory, a flash memory, a read-only memory, a programmable read-only memory, or an electrically erasable programmable memory, a register, or the like. The storage medium may be located in the memory, and the processor may read the information in the memory and complete the steps of the method in combination with the hardware.

It is understood that the memory in the embodiments of the present disclosure may be a volatile memory or a non-volatile memory, or may include both the volatile and the non-volatile memory. The non-volatile memory may be a read-only memory (ROM), a programmable read-only memory (Programmable ROM), an erasable programmable read-only memory (Erasable PROM), an electrically erasable programmable read-only memory (Electrically EPROM), or a flash memory. The volatile memory may be a Random Access Memory (RAM) that functions as an external cache. By way of example, but not limitation, many forms of RAM may be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a sync link dynamic random access memory (Sync Link DRAM, SLDRAM), and a direct memory bus random access memory (Direct Rambus RAM, DR RAM). It should be noted that the memories of the systems and methods described herein are intended to include, but are not limited to, these and any other suitable types of memories.

It should be understood that the above-described memory is exemplary but not limiting. For example, the memory in the embodiment of the present disclosure may also be a static random access memory (static RAM), a dynamic random access memory (dynamic RAM), a synchronous dynamic random access memory (synchronous DRAM), a double data rate synchronous dynamic random access memory (double data rate SDRAM), an enhanced synchronous dynamic random access memory (enhanced SDRAM, ESDRAM), a synchronous connection dynamic random access memory (synch link DRAM, SLDRAM), a direct memory bus random access memory (Direct Rambus RAM, DR RAM), or the like, That is, the memory in this application embodiment is intended to include, but is not limited to, these and any other suitable types of memory.

Embodiments of the present disclosure further provide a computer-readable storage medium for storing a computer program.

Alternatively, the computer-readable storage medium may be applied to the network device in the embodiments of the present disclosure, and the computer program causes a computer to perform the corresponding processes implemented by the network device in the methods in the embodiments of the present disclosure. For brevity, details are not described herein.

Alternatively, the computer-readable storage medium may be applied to the mobile terminal/terminal in the embodiments of the present disclosure, and the computer program causes the computer to perform the corresponding processes implemented by the mobile terminal/terminal in the methods of the embodiments of the present disclosure. For brevity, details are not described herein.

Embodiments of the present disclosure further provide a computer program product including computer program instructions.

Alternatively, the computer program product may be applied to the network device in the embodiments of the present disclosure, and the computer program instruction causes the computer to perform the corresponding processes implemented by the network device in the methods in the embodiments of the present disclosure. For brevity, details are not described herein.

Alternatively, the computer program product may be applied to the mobile terminal/terminal in the embodiments of the present disclosure, and the computer program instruction causes the computer to perform the corresponding processes implemented by the mobile terminal/terminal in the methods of the embodiments of the present disclosure. For brevity, details are not described herein.

Embodiments of the present disclosure further provide a computer program.

Alternatively, the computer program may be applied to the network device in the embodiment of the present disclosure. When the computer program runs on a computer, the computer performs the corresponding processes implemented by the network device in the methods in the embodiments of the present disclosure. For brevity, details are not described herein.

Alternatively, the computer program may be applied to the mobile terminal/terminal in the embodiment of the present disclosure. When the computer program runs on a computer, the computer performs the corresponding processes implemented by the mobile terminal/terminal in the methods in the embodiments of the present disclosure. For brevity, details are not described herein.

Those of ordinary skill in the art will appreciate that the units and algorithm steps of the examples described in connection with the embodiments disclosed herein can be implemented in electronic hardware, or a combination of computer software and electronic hardware. Whether these functions are performed in hardware or software depends on the particular application and design constraints of the technical solutions. Those of ordinary skill in the art may implement the described functions using different methods for each particular application, but such implementation should not be considered beyond the scope of the present disclosure.

Those skilled in the art will clearly understand that, for convenience and brevity of the description, references may be made to the corresponding process in the foregoing method embodiments for the detailed working processes of the system, apparatus and unit described above.

In the several embodiments provided herein, it should be understood that the disclosed systems, apparatus, and methods may be implemented in other ways. For example, the apparatus embodiments described above are merely illustrative. For example, the division of the unit is merely a logical function division, and may be implemented in other ways, e.g., multiple units or components may be combined or integrated into another system, or some features may be ignored or not performed. Alternatively, the shown or discussed mutual coupling, direct coupling or communication connection to one another may be via some interface, devices or units, which may be implemented in electrical, mechanical or other forms.

The units described as separate parts may or may not be physically separate, and the parts displayed as units may or may not be physical units, i.e. may be located in one place, or may be distributed over a plurality of network units. Some or all of the units may be selected according to actual needs to achieve the purpose of the present embodiment solution.

In addition, the functional units in the various embodiments of the present disclosure may be integrated in one processing Lunt, or each unit may exist alone physically, or two or more units may be integrated in one unit.

If the function is implemented in the form of a software functional unit and sold or used as an independent product, it can be stored in a computer readable storage medium. Based on such an understanding, the technical solution of the present disclosure can be embodied in the form of a software product in essence or the part that contributes to the existing technology or the part of the technical solution. The computer software product is stored in a storage medium and includes a number of instructions to enable a computer device (which may be a personal computer, a server, or a network device, etc.) to perform all or part of the steps of the methods described in the various embodiments of the present disclosure. The aforementioned storage media include a USB flash drive, a removable hard disk, a read-only memory (Read-Only Memory) ROM, a random access memory (RAM), a magnetic disk, or an optical disc, which can store program code.

The foregoing description is merely a specific implementation of the present disclosure, but the scope of protection of the present disclosure is not limited thereto. Any change or replacement readily contemplated by a person skilled in the art within the technical scope disclosed in the present application shall fall within the scope of protection of the present disclosure. Therefore, the scope of protection of the present application shall be subject to the scope of protection of the claims.

The invention claimed is:

1. A method for data transmission, comprising:
   transmitting, by a terminal, uplink data to a network device through a Non-Access Stratum (NAS) message; and
   in response to a number of failures in transmitting the uplink data by the terminal reaching a first threshold, performing, by the terminal, a Radio Resource Control (RRC) connection establishment procedure, establishing, by the terminal, a dedicated bearer through the RRC connection establishment procedure, and transmitting, by the terminal, the uplink data through the dedicated bearer,
   wherein the transmitting, by the terminal, the uplink data to the network device through the NAS message comprises:
   triggering, by a NAS layer of the terminal, an Access Stratum (AS) layer of the terminal to: transmit the uplink data to the network device and start a first timer; and
   in response to failing to complete transmission of the uplink data upon expiration of the first timer, notifying, by the AS layer of the terminal, the NAS layer of the terminal that transmission of the uplink data fails.

2. The method of claim 1, wherein in response to the number of failures in transmitting the uplink data by the terminal reaching the first threshold, performing, by the terminal, the RRC connection establishment procedure comprises:
   determining, by the NAS layer of the terminal, that the number of failures in transmitting the uplink data reaches the first threshold, and
   notifying, by the NAS layer of the terminal, the AS layer of the terminal to transmit a RRC connection establishment request message.

3. The method of claim 2, wherein the determining, by the NAS layer of the terminal, that the number of failures in transmitting the uplink data reaches the first threshold comprises:
   each time after triggering the AS layer of the terminal to transmit the uplink data to the network device, adding, by the NAS layer of the terminal, 1 to a value of a first counter; and
   determining, by the NAS layer of the terminal, that the value of the first counter reaches the first threshold.

4. The method of claim 3, wherein the first counter is configured to count transmission times of same uplink data.

5. The method of claim 1, wherein in response to the number of failures in transmitting the uplink data by the terminal reaching the first threshold, performing, by the terminal, the RRC connection establishment procedure comprises:
   determining, by the AS layer of the terminal, that the number of failures in transmitting the uplink data reaches the first threshold,
   transmitting, by the AS layer of the terminal, a RRC connection establishment request message, and
   notifying, by the AS layer of the terminal, the NAS layer of the terminal to perform the RRC connection establishment procedure.

6. The method of claim 5, wherein the determining, by the AS layer of the terminal, that the number of failures in transmitting the uplink data reaches the first threshold comprises:
   each time after transmitting the uplink data to the network device, adding, the AS layer of the terminal, 1 to a value of a second counter; and
   determining, by the AS layer of the terminal, that the value of the second counter reaches the first threshold.

7. The method of claim 5, wherein the second counter is configured to count transmission times of same uplink data.

8. A terminal, comprising:
   a transceiver, configured to transmit uplink data to a network device through a Non-Access Stratum (NAS) message; and in response to a number of failures in transmitting the uplink data by the terminal reaching a first threshold, the transceiver is further configured to perform a Radio Resource Control (RRC) connection establishment procedure, establish a dedicated bearer through the RRC connection establishment procedure, and transmit the uplink data through the dedicated bearer,
   wherein the transceiver comprises a NAS layer and an Access Stratum (AS) layer;
   wherein the NAS layer is configured to trigger the AS layer to: transmit the uplink data to the network device and start a first timer; and
   in response to failing to complete transmission of the uplink data upon expiration of the first timer, the AS layer is further configured to notify the NAS layer that transmission of the uplink data fails.

9. The terminal of claim 8, wherein the NAS layer is further configured to determine that the number of failures in transmitting the uplink data reaches the first threshold, and notify the AS layer to transmit a RRC connection establishment request message.

10. The terminal of claim 9, wherein each time after the NAS layer triggers the AS layer to transmit the uplink data to the network device, the NAS layer is configured to add 1 to a value of a first counter; and the NAS layer is further configured to determine that the value of the first counter reaches the first threshold.

11. The terminal of claim 10, wherein the first counter is configured to count transmission times of same uplink data.

12. The terminal according to claim 8, wherein the AS layer is configured to determine that the number of failures in transmitting the uplink data reaches the first threshold, and the AS layer is further configured to transmit a RRC connection establishment request message, and notify the NAS layer of the terminal to perform the RRC connection establishment procedure.

13. The terminal of claim 12, wherein each time after the AS layer transmits the uplink data to the network device, the AS layer is configured to add 1 to a value of a second counter; the AS layer is further configured to determine that the value of the second counter reaches the first threshold.

14. The terminal of claim 13, wherein the second counter is configured to count transmission times of same uplink data.

15. A terminal, comprising:
   a transceiver, configured to receive first indication information from a network device, the first indication information being used to indicate a signal quality threshold; and
   a processor, configured to measure a first signal quality of a target cell; and
   the processor, further configured to determine a transmission mode of uplink data based on the measured first signal quality and the signal quality threshold, wherein the processor is further configured to:
in response to the measured first signal quality being less than the signal quality threshold, notify, by an Access Stratum (AS) layer of the terminal, a Non-Access Stratum (NAS) layer of the terminal that transmission of the uplink data is not supported; and
in response to the measured first signal quality being greater than or equal to the signal quality threshold, notify, by the AS layer of the terminal, the NAS layer of the terminal that the transmission of the uplink data is supported.

16. The terminal according to claim 15, wherein the processor is configured to: in response to the measured first signal quality being greater than or equal to the signal quality threshold, determine to transmit the uplink data to the network device in an Early Data Transmission (EDT) mode; and in response to the measured first signal quality being less than the signal quality threshold, the determine to transmit the uplink data to the network device through a dedicated bearer.

17. The terminal of claim 15, wherein the signal quality comprises at least one of Reference Signal Received Power (RSRP), Reference Signal Received Quality (RSRQ) or Signal to Interference plus Noise Ratio (SINR).

* * * * *